United States Patent [19]

Zarouni

[11] 3,883,702

[45] May 13, 1975

[54] COMMUNICATION PATH FAULT DETECTOR

[75] Inventor: Alfred Zarouni, Middletown, N.J.

[73] Assignee: Bell Telephone Laboratories, Incorporated, Murray Hill, N.J.

[22] Filed: May 20, 1974

[21] Appl. No.: 471,673

[52] U.S. Cl. .................... 179/175.3 R; 179/175.2 R

[51] Int. Cl. ............................................ H04m 3/22

[58] Field of Search ............179/175.2 R, 175.3 R, 179/175.2 C, 18 FH, 27 DB

[56] References Cited

UNITED STATES PATENTS

| | | | |
|---|---|---|---|
| 2,863,958 | 12/1958 | Clement | 179/175.2 R |
| 2,866,008 | 12/1958 | Walsh | 179/175.2 R |
| 3,211,837 | 10/1965 | Bruglemans | 179/18 FH |

*Primary Examiner*—Kathleen H. Claffy
*Assistant Examiner*—Douglas W. Olms
*Attorney, Agent, or Firm*—F. W. Padden

[57] ABSTRACT

This specification discloses applique circuitry for an incoming trunk circuit. The circuitry detects those faults and "black box" devices on telephone call connections which produce undesired momentary off-hook signals for tripping incoming call ringing and allowing call conversation, but which are inadequate for generating called party answer signals needed for charging purposes. Relays in the circuitry are activated by the trunk circuit for producing a timed test answer signal following the tripping of ringing. The test signal operates timer and flip-flop circuits for generating a fault alarm only when a valid answer signal is not received during the persistence of the test signal. These circuits further control the trunk circuit to hold call connections for manual tracing and identification of the called station.

11 Claims, 1 Drawing Figure

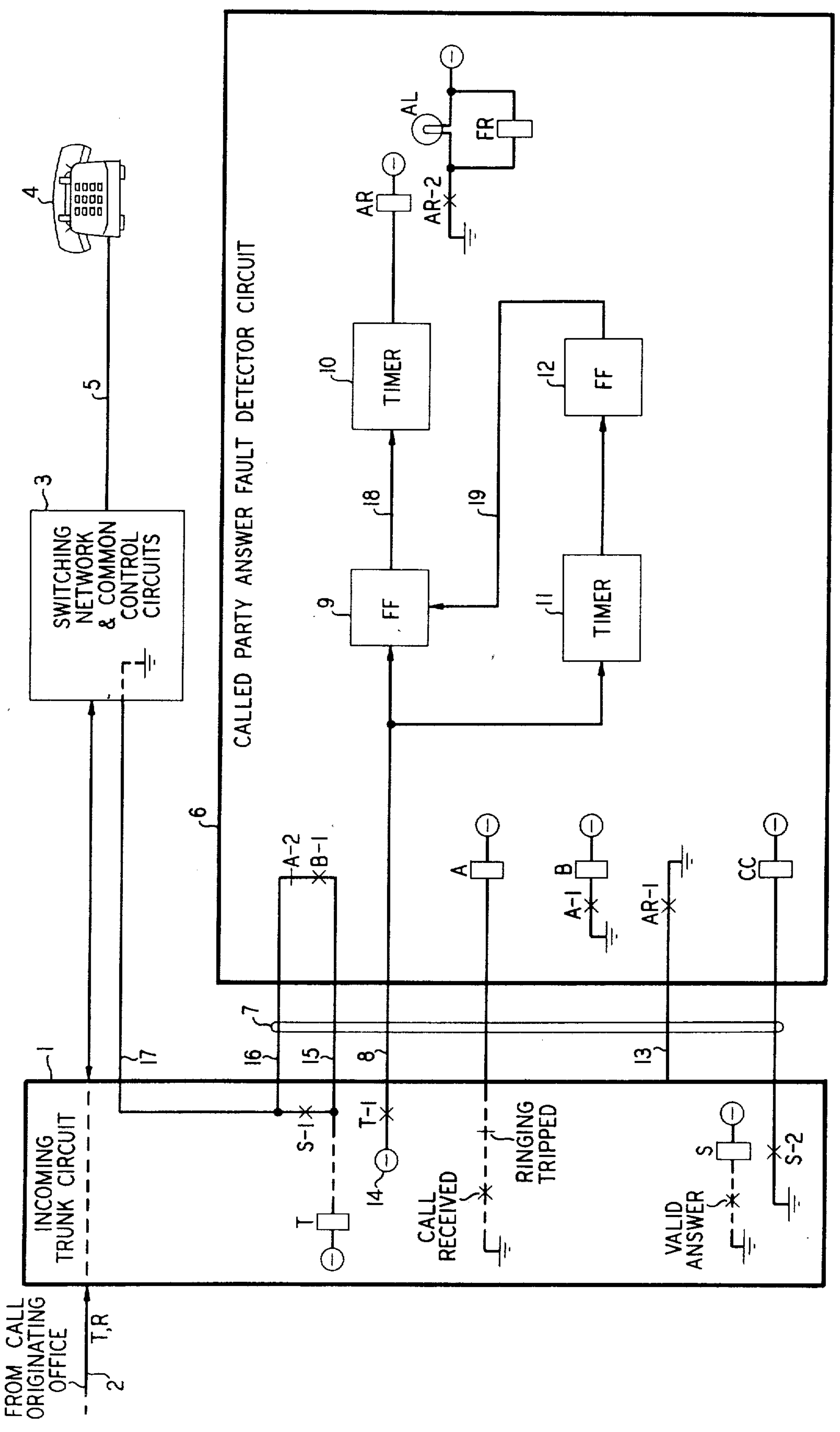
FROM CALL ORIGINATING OFFICE
T,R
2
1
INCOMING TRUNK CIRCUIT
T
S-1
T-1
14
CALL RECEIVED
RINGING TRIPPED
VALID ANSWER
S
S-2
17
16
15
8
13
7
6
A-2
B-1
A
B
A-1
AR-1
CC
SWITCHING NETWORK & COMMON CONTROL CIRCUITS
3
5
4
CALLED PARTY ANSWER FAULT DETECTOR CIRCUIT
9
FF
18
10
TIMER
19
11
TIMER
12
FF
AR
AR-2
AL
FR

COMMUNICATION PATH FAULT DETECTOR

BACKGROUND OF THE INVENTION

This invention relates to communication systems and particularly to circuitry for detecting faults on telephone station lines which avoid or interfere with the charging for calls.

Telephone switching systems are designed to initiate charging for a toll call in response to a called party answer signal. Such a signal is usually generated following the ringing of the called telephone and specifically as a result of the removal of the telephone handset to its "off-hook" state. The handset off-hook effects the tripping of the ringing and causes trunk circuitry to send a called station answer signal to the call charging equipment. The latter equipment is arranged to delay the initiation of charging operations for a prescribed interval after the receipt of the answer signal. This delay is utilized to guard against false charging due to answer simulating transient signals, such as induced voltages on transmission path.

Although the use of the delay interval has been a practical technique for preventing false charging on substantially all toll calls, it has heretofore permitted the avoidance or interference with valid charging due to faulty apparatus or cable facilities or by the unauthorized use of so-called "black box" devices on called station lines. Such devices are purposely bridged across a telephone line for responding to incoming call ringing by momentarily connecting a low impedance across the called line to trip the ringing and preclude an adequate called station answer signal from being sent to the call charging equipment. As a consequence, the telephone switching machine customarily completes connections for such calls on a no-charge basis and without detecting the use of the device or identifying the called station to which it is attached.

In view of the foregoing, a need exists in switching systems for facilities which detect faults or black box devices on called station lines that interfere with or avoid valid charging for calls.

SUMMARY OF THE INVENTION

In accordance with principles of my invention, circuitry is integrated into a telephone switching system for detecting an undesired avoidance of call charging resulting from the tripping of ringing on an incoming call and the absence of an adequate called station answer signal. My specific illustrative circuitry cooperates with an incoming trunk circuit to force the generation of a test called station answer signal in response to the tripping of ringing on an incoming call. The test signal activates a logic circuit which times the duration of the test signal and provides an alarm only when a valid called party answer signal is not generated during the persistence of the test signal. Advantageously, the exemplary circuitry is responsive to the alarm for holding call connections so that illustratively a manual trace can be made to identify the called station associated with the undesired condition. The alarm also activates circuitry which counts the number of faults to aid telephone company personnel in determining the magnitude of the undesired condition.

It is an advantage of my illustrative circuitry that the test answer signal is generated by the same incoming trunk circuitry which sends a valid called party answer signal to the call charging equipment. Accordingly, my detector circuit is arranged so that an answer signal is also sent to the charging equipment immediately with the generation of the test answer signal; but, importantly, the duration of that sending is such that the call may be completed on a no-charge basis as in present-day systems when a black box or fault is involved on the call.

A feature of my illustrative embodiment is that the duration of the test signal is controlled by a pair of relays. A first one of the relays is activated by the incoming trunk circuit upon a receipt of a call and is subsequently released by the trunk circuit following the tripping of ringing on the call. A second one of the relays is controllably activated solely by the first relay, but is a slow release device so as to control the duration of the test answer signal. During the release of the second relay, contacts of the pair of relays activate the incoming trunk circuit to generate the test answer signal.

My exemplary logic circuit is activated by both test and valid called party answer signals from the incoming trunk circuit for checking the occurrence of a valid answer signal and for generating an alarm only when it is not received during the persistence of the test signal. A feature of the logic circuit is that it comprises a flip-flop timer arrangement which is set by the test signal to initiate an alarm timing interval. This interval is greater than the delay interval used in the call charge equipment before initiating charging operations. An expiration of the alarm timing indicates that a valid answer signal has not been generated by the incoming trunk circuit. Accordingly, my illustrative alarm timer activates an alarm device which, in turn, signals the trunk circuit to hold call connections for manual tracing and identification of the called station.

The logic circuit also includes means for resetting the alarm flip-flop - timer to preclude an expiration of alarm timing when a valid answer signal is received during the persistence of the test signal. My resetting means comprises a timer which is activated only during the presence of an input test or valid answer signal. It commences timing in response to the test answer signal and continues timing to its expiration only when a valid answer signal is received from the trunk circuit during the presence of the test signal. Upon the expiration of its timing, the resetting timer activates a flip-flop to reset the alarm flip-flop and timer to preclude the alarm. On the other hand, if both the test and valid answer signals do not overlap, the reset timer and flip-flop do not reset the alarm flip-flop and its timer proceeds to generate the alarm to indicate the existence of a fault or black box device on the called line.

DRAWING DESCRIPTION

The invention, together with its various objects and features, can be easily understood from the following more detailed description of a specific illustrative embodiment thereof read in conjunction with the accompanying single sheet of a schematic and block diagram drawing of an exemplary called party answer fault detector circuit.

It will be noted that the drawing employs a type of notation referred to as "detached-contact" in which an "X" represents a normally opened contact of a relay and a vertical bar crossing a line represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the *American Institute of Electrical Engineers Transactions, Communications and Electronics*, Volume 74, pages 505–513.

DETAILED DESCRIPTION

In the drawing, there is shown an incoming trunk circuit 1 which receives incoming calls over an incoming trunk 2 from a call originating office (not shown) and extends them, in a well-known manner, through switching network and common control circuits 3 to a called telephone station 4 via a station line 5. Trunk circuit 1 includes conventional supervisory and called party answer control relays S and T, respectively, which are extensively used in present-day switching systems. Relay S is normally operable following the tripping of ringing and in response to a valid called party answer at station 4. Among the customary functions of relay S on a routine chargeable call is the supervision of call connections to station 4. Relay S also functions on a chargeable call to operate relay T via contact S-1 and a ground supplied by control circuit 3. The operation of relay T effects a voltage polarity reversal on the tip and ring leads T,R of trunk 2 as a called party answer signal to the call originating office. The latter signal in a conventional way causes charging equipment actions for initiating call charging after the customary delay interval which illustratively may be 0.6 seconds.

I have discovered specific irregularities in the operations of the S and T relays due to certain faults and black box devices which provide momentary low impedance off-hook signals on a station line 5 in response to incoming call ringing. The momentary off-hook has proven either to cause relay S not to operate or to operate for a duration which is insufficient for charging purposes. To elaborate, under such circumstances relay S does not adequately operate relay T for reversing leads T and R to return a called party answer signal to the charging equipment for greater than the charge delay interval illustratively of 0.6 second duration. As a consequence, any tip and ring reversals of less than 0.6 second duration would be treated as transient and existing charging equipments would accordingly not initiate call charging.

According to principles of my invention, trunk circuit 1 is equipped with a called party answer fault detector circuit 6 for monitoring each call to time the period following the tripping of ringing and for providing an alarm only when a reversal of leads T and R does not occur or persist for a period slightly greater than 0.6 second following the ring trip. Circuit 6 is connected to strategic points in trunk circuit 1 over cable 7 for initially controlling by relays A and B the generation of a test called party answer signal over lead 8. Subsequently, circuit 6 is responsive to the test signal for timing by means of flip-flop 9 and timer 10 to determine whether a valid called party answer signal is generated by trunk circuit 1 prior to the expiration of 0.6 second. If a valid signal is so generated, circuit 6 resets flip-flop 9 and, in turn, timer 10, by means of another timer 11 and flip-flop 12, and thereby to preclude an alarm. On the other hand, if a valid signal does not occur prior to an expiration of the test signal and persist beyond 0.6 seconds from the detection of the ring trip, timer 10 times out and causes an alarm to be generated by means of operating relay AR. In turn, relay AR provides an alarm ground signal to lead 13 for enabling trunk circuit 1 to hold call connections for manual tracing and identification of the called station.

Turning now to the detailed operations, relay A in circuit 6 is operated over the obvious path upon receipt of an incoming call by trunk circuit 1 and prior to the tripping of ringing by a low impedance off-hook signal across line 5. In operating, relay A operates relay B via contact A-1. Circuit 6 then awaits an application of ringing to line 5 and then the tripping of that ringing.

The latter is detected by trunk circuit 1 in a conventional manner and results in the opening of the operate path for relay A at the symbolic break contact "ringing tripped" whereupon relay A releases and, in turn, opens the operate path for the slow release relay B. Advantageously, during the slow release of relay B, relay T in trunk circuit 1 is forced to operate for connecting a negative potential 14 via its contact T-1 to lead 8 as a test called party answer signal. The release time of relay B is designed such that the total operated time of relay T for fault testing is illustratively less than 0.6 second in order that false charging does not result from a reversal of the leads T and R because of the forced operation of relay T. The forced operation of relay T occurs over a path from its winding through intermediate control contacts of other relays (not shown), lead 15, contacts A-2 and B-1, lead 16 and a ground supplied to lead 17 by the common control circuits 3 on a chargeable call. On nonchargeable calls, the control circuits withhold the ground from lead 17 and preclude the fault detector 6 operation under control of relays A and B.

When potential 14 is connected to lead 8, it sets flip-flop 9 for producing an output on lead 18 which activates timer 10 to initiate a generation of an alarm time period slightly greater than 0.6 second. The potential on lead 8 concurrently activates an alarm reset timer 11 for initiating a generation of a reset time period slightly less than 0.6 second.

If, during these timing operations, an off-hook signal persists on line 5 and is detected by circuit 1 in a well-known manner as a valid called party answer, relay S is operated over the obvious path. In turn, operated relay S closes a supplemental operate path for relay T via its contact S-1. When relays S and T are thus operated during the release of relay B, potential 14 is maintained on lead 8 beyond the test signal period of slightly less than 0.6 second for indicating a valid called party answer signal. This persistance of potential 14 on lead 8 causes timer 11 to time out and to set flip-flop 12 which, in turn, produces an output on lead 19 for resetting flip-flop 9 to arrest further timing by timer 10 and thereby to preclude a fault alarm.

On the other hand, if a momentary off-hook was produced on line 5 to trip the ringing and it is inadequate for charging purposes, relay T is released following the release of relay B and immediately withdraws the test signal potential 14 from lead 8. Accordingly, timer 11 ceases further timing toward its limit of slightly less than 0.6 second and thereby precludes the resetting of flip-flop 9. As a result, timer 10 continues timing toward its expiration and then finally operates alarm relay AR to indicate a detection of a fault. In operating, relay AR supplies a ground via its contact AR-1 to trunk circuit 1 for holding call connections in a known manner for manual tracing and identification of the called station 4. It is within the purview of my invention to enable operated relay AR to reoperate relay T for sending a reversal over trunk 2 and thereby causing a charge to be made for the call. Operated relay AR also closes its contact AR-2 for both energizing an alarm lamp AL to alert maintenance personnel to the detected fault and activating a fault register FR which accumulates the total number of detected faults. Maintenance personnel may advantageously compare the contents of register FR with the count contents of a call counter CC which counts the total number of calls served by trunk circuit. Counter CC is incremented under control of relay S via its contact S-2.

It is to be understood that the hereinbefore described arrangements are illustrative of the application of principles of my invention. In light of this teaching, it is apparent that numerous other arrangements may be devised by those skilled in the art without departing from the spirit and scope of my invention.

What is claimed is:

1. A circuit for use on a communication connection to detect an undesired condition which trips called station ringing and interferes with a called station answer signal needed for call charging and comprising means responsive to a receipt of a signal signifying a tripping of called station ringing following a receipt of a call for producing a test signal persistent for a prescribed duration, means activated by said test signal for generating a timed interval an expiration of which indicates an undesired condition that interferes with a valid called station answer signal, and means responsive to a receipt of a valid called station answer signal during the persistence of said test signal for deactivating said generating means to arrest a generation of said timed interval prior to said expiration.

2. The invention of claim 1 wherein said producing means comprises control means activated in response to a receipt of an incoming call and thereafter being deactivated in response to a receipt of a said signal signifying a tripping of called station ringing, and means cooperating with said control means and being responsive to an activation and deactivation of said control means for providing said test signal persistent for said prescribed duration.

3. The invention of claim 2 wherein said control means includes a first relay activated in response to a receipt of an incoming call and deactivated in response to a receipt of a signal signifying a tripping of called station ringing on said call and a second relay operated in response to an activation of said first relay and having a slow time release subsequently initiated upon a deactivation of said first relay, and wherein said providing means includes contacts of said first and second relays and being effective during a concurrent deactivation of said first relay and said slow time release of said second relay for providing said test signal persistent for said prescribed duration.

4. The invention of claim 1 wherein said generating means includes a timer operable for initiating said timed interval and progressing toward an expiration of said timed interval, and a bistable switching means responsive to a receipt of said test signal for operating said timer and including means responsive to a receipt of a reset signal for terminating the operation of said timer.

5. The invention of claim 4 further comprising means activated by said timer upon an expiration of said timed interval for indicating said undesired condition, and means activated by indicating means for subsequently holding said communication connection.

6. The invention of claim 4 wherein said means for deactivating said generating means includes means responsive to a receipt of said test signal and a valid called station answer signal within a predetermined time period prior to an expiration of said timed interval for supplying said reset signal to said bistable switching means.

7. The invention of claim 6 wherein said supplying means includes a timing device responsive to a receipt of said test signal for initiating timing of said predetermined time period and subsequently responsive to a termination of said test signal for arresting timing of said time period to control a withholding of said reset signal.

8. The invention of claim 7 wherein said timing device is further responsive to a receipt of a valid called party answer signal during the persistence of said test signal for continuing said timing toward an expiration of said predetermined time period.

9. The invention of claim 8 wherein said supplying means further includes means activated by said timing device at the expiration of said predetermined time period for supplying said reset signal to said bistable means.

10. Incoming trunk circuitry for determining a tripping of called station ringing over call connections and an absence of a valid called station answer signal for call charging and comprising switch means activated by an incoming trunk in response to a receipt of an incoming call and subsequently deactivated by said trunk in response to a detection of a tripping of called station ringing, a slow release switch device operated by the activated switch means and slow released upon a deactivation of said switch means, circuit means in said incoming trunk activated in response to a deactivation of said switch means and during the slow release of said switch device for forcing a called party answer signal, said circuit means being further held activated in response to a receipt of a valid called station answer signal, a first timer activatable for generating a timed interval an expiration of which indicates an absence of a valid called station answer signal, bistable means responsive to an activation of said circuit means for switching from a first to a second stable state to activate said timer and having means subsequently responsive to a receipt of a reset signal for resetting said bistable means to said first state for deactivating said timer to arrest further generation of said timed interval, a second timer responsive to said activation of said circuit means for producing a timed period an expiration of which indicates a receipt of a valid called station answer signal, means responsive to an expiration of said timed period for supplying a reset signal to said bistable means, and means operated by said first timer upon an expiration of said timed interval for controlling said incoming trunk to hold call connections to the called station.

11. A called party answer fault detector circuit comprising means responsive to a receipt of a signal signifying a tripping of a called station ringing signal for generating a timed interval, means determining a receipt of a valid called station answer signal during the generation of said timed interval for deactivating said generating means to arrest the generation of said timed interval, and means activated by said generating means upon an expiration of said timed interval for indicating a called party answer fault.

* * * * *